US009275111B2

(12) United States Patent
El-Moslimany (10) Patent No.: US 9,275,111 B2
(45) Date of Patent: *Mar. 1, 2016

(54) MINIMIZING RESULT SET SIZE WHEN CONVERTING FROM ASYMMETRIC TO SYMMETRIC REQUESTS

(71) Applicant: International Business Machines Corporation, Armonk, NY (US)

(72) Inventor: Ahmad E. El-Moslimany, Nutley, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 419 days.

This patent is subject to a terminal disclaimer.

(21) Appl. No.: 13/842,179

(22) Filed: Mar. 15, 2013

(65) Prior Publication Data

US 2014/0280279 A1    Sep. 18, 2014

(51) Int. Cl.
*G06F 17/30* (2006.01)

(52) U.S. Cl.
CPC .... *G06F 17/30498* (2013.01); *G06F 17/30389* (2013.01); *G06F 17/30442* (2013.01); *G06F 17/30584* (2013.01); *G06F 17/30592* (2013.01)

(58) Field of Classification Search
CPC ............... G06F 17/30389; G06F 17/30442; G06F 17/30498; G06F 17/30637
USPC ................................................ 707/759, 668
See application file for complete search history.

(56) References Cited

U.S. PATENT DOCUMENTS

| | | | |
|---|---|---|---|
| 6,112,198 A | 8/2000 | Lohman et al. | |
| 6,898,603 B1 * | 5/2005 | Petculescu | G06F 17/30902 707/600 |
| 7,356,542 B2 | 4/2008 | Gupta et al. | |
| 7,356,779 B2 | 4/2008 | Cras et al. | |
| 7,490,106 B2 | 2/2009 | Dumitru et al. | |
| 7,809,678 B2 | 10/2010 | Berger et al. | |
| 7,917,504 B2 * | 3/2011 | Cha et al. | 707/724 |
| 7,945,597 B2 | 5/2011 | Cras et al. | |
| 8,103,687 B2 | 1/2012 | Baumgartner et al. | |
| 8,224,787 B2 * | 7/2012 | Swett | G06F 17/30339 707/668 |
| 8,838,598 B2 * | 9/2014 | Bhide et al. | 707/737 |
| 8,909,630 B1 * | 12/2014 | Seth et al. | 707/724 |
| 9,043,310 B2 * | 5/2015 | Liu | G06F 17/30498 707/714 |

(Continued)

OTHER PUBLICATIONS

Bin Zhou, et al., "OLAP on Search Logs: An Infrastructure Supporting Data-Drive Applications in Search Engines", ACM, 2009, pp. 1-9.

(Continued)

*Primary Examiner* — Jean M Corrielus
(74) *Attorney, Agent, or Firm* — Sawyer Law Group, P.C.

(57) ABSTRACT

A method, system, and a computer program product for converting asymmetric requests into symmetric requests are disclosed. In a first aspect, the method comprises a computer partitioning a query into a set of partitions along a dimension of a multi-dimensional data source, wherein each partition of the set of partitions comprises more than one member and the query has a query result count. The method includes the computer creating a candidate query for each partition of the set of partitions, wherein each candidate query has a candidate query result count. Responsive to a determination that the query result count is greater than a sum of the candidate query result counts, the method includes the computer substituting the query with the candidate queries.

13 Claims, 4 Drawing Sheets

(56) References Cited

U.S. PATENT DOCUMENTS

| | | |
|---|---|---|
| 2003/0115194 A1 | 6/2003 | Pitts et al. |
| 2005/0177553 A1* | 8/2005 | Berger .............. G06F 17/30333 |
| 2008/0033937 A1* | 2/2008 | Cha et al. .......................... 707/5 |
| 2008/0270365 A1* | 10/2008 | Baccash ............ G06F 17/30457 |
| 2009/0144235 A1* | 6/2009 | Bhide et al. ........................ 707/3 |
| 2009/0144303 A1* | 6/2009 | Bhide et al. ................... 707/101 |
| 2010/0121868 A1* | 5/2010 | Biannic et al. ................ 707/759 |
| 2010/0121869 A1* | 5/2010 | Biannic ........................ 707/759 |
| 2011/0022816 A1* | 1/2011 | Swett ................ G06F 17/30584 711/173 |
| 2011/0137890 A1* | 6/2011 | Bestgen ............ G06F 17/30466 707/719 |
| 2012/0284235 A1* | 11/2012 | Swett ................ G06F 17/30584 707/668 |
| 2013/0117255 A1* | 5/2013 | Liu ................... G06F 17/30592 707/714 |

OTHER PUBLICATIONS

Ladjel Bellatreche, et al., "OLAP Query Processing for Partitioned Data Warehouses", IEEE, 1999, pp. 1-8.

* cited by examiner

| Tuple set 1 (TS1) | | | | | Crossjoin 1 (CJ1) | | | | | |
|---|---|---|---|---|---|---|---|---|---|---|
| | X | Y | A | B | Dimensions | X | Y | A | B | Dimensions |
| T1 | x1 | y1 | a1 | b1 | | x1 | y1 | a1 | b1 | |
| T2 | x1 | y1 | a1 | b3 | | x2 | y2 | a2 | b2 | |
| T3 | x1 | y1 | a2 | b1 | | | | | b3 | Result count |
| T4 | x1 | y1 | a2 | b2 | | Member count | 2 | 2 | 2 | 3 | 24 |
| T5 | x1 | y1 | a2 | b3 | | | | | | |
| T6 | x2 | y2 | a1 | b1 | | | | | | |
| T7 | x2 | y2 | a1 | b2 | | | | | | |
| T8 | x2 | y2 | a1 | b3 | | | | | | |
| T9 | x2 | y2 | a2 | b1 | | | | | | |
| T10 | x2 | y2 | a2 | b3 | | | | | | |

| TS2 (partition along X for tuples of TS1 with member x1) | | | | | CJ2 | | | | | |
|---|---|---|---|---|---|---|---|---|---|---|
| | X | Y | A | B | Dimensions | X | Y | A | B | Dimensions |
| T1 | x1 | y1 | a1 | b1 | | x1 | y1 | a1 | b1 | |
| T2 | x1 | y1 | a1 | b3 | | | | a2 | b2 | |
| T3 | x1 | y1 | a2 | b1 | | | | | b3 | Result count |
| T4 | x1 | y1 | a2 | b2 | | Member count | 1 | 1 | 2 | 3 | 6 |
| T5 | x1 | y1 | a2 | b3 | | | | | | |

| TS3 (partition along X for tuples of TS1 with member x2) | | | | | CJ3 | | | | | |
|---|---|---|---|---|---|---|---|---|---|---|
| | X | Y | A | B | Dimensions | X | Y | A | B | Dimensions |
| T6 | x2 | y2 | a1 | b1 | | x2 | y2 | a1 | b1 | |
| T7 | x2 | y2 | a1 | b2 | | | | a2 | b2 | |
| T8 | x2 | y2 | a1 | b3 | | | | | b3 | Result count |
| T9 | x2 | y2 | a2 | b1 | | Member count | 1 | 1 | 2 | 3 | 6 |
| T10 | x2 | y2 | a2 | b3 | | | | | | |

| TS4 (partition along A for tuples of TS2 with member a1) | | | | | CJ4 | | | | | |
|---|---|---|---|---|---|---|---|---|---|---|
| | X | Y | A | B | Dimensions | X | Y | A | B | Dimensions |
| T1 | x1 | y1 | a1 | b1 | | x1 | y1 | a1 | b1 | |
| T2 | x1 | y1 | a1 | b3 | | | | | b3 | Result count |
| | | | | | | Member count | 1 | 1 | 1 | 2 | 2 |

| TS5 (partition along A for tuples of TS2 with member a2) | | | | | CJ5 | | | | | |
|---|---|---|---|---|---|---|---|---|---|---|
| | X | Y | A | B | Dimensions | X | Y | A | B | Dimensions |
| T3 | x1 | y1 | a2 | b1 | | x1 | y1 | a2 | b1 | |
| T4 | x1 | y1 | a2 | b2 | | | | | b2 | |
| T5 | x1 | y1 | a2 | b3 | | | | | b3 | Result count |
| | | | | | | Member count | 1 | 1 | 1 | 3 | 3 |

| TS6 (partition along A for tuples of TS3 with member a1) | | | | | CJ6 | | | | | |
|---|---|---|---|---|---|---|---|---|---|---|
| | X | Y | A | B | Dimensions | X | Y | A | B | Dimensions |
| T6 | x2 | y2 | a1 | b1 | | x2 | y2 | a1 | b1 | |
| T7 | x2 | y2 | a1 | b2 | | | | | b2 | |
| T8 | x2 | y2 | a1 | b3 | | | | | b3 | Result count |
| | | | | | | Member count | 1 | 1 | 1 | 3 | 3 |

| TS7 (partition along A for tuples of TS3 with member a2) | | | | | CJ7 | | | | | |
|---|---|---|---|---|---|---|---|---|---|---|
| | X | Y | A | B | Dimensions | X | Y | A | B | Dimensions |
| T9 | x2 | y2 | a2 | b1 | | x2 | y2 | a2 | b1 | |
| T10 | x2 | y2 | a2 | b3 | | | | | b3 | Result count |
| | | | | | | Member count | 1 | 1 | 1 | 2 | 2 |

MINIMIZING RESULT SET SIZE WHEN CONVERTING FROM ASYMMETRIC TO SYMMETRIC REQUESTS

FIELD OF THE INVENTION

The present invention relates to data analysis, and more particularly, to minimizing result set size when converting from asymmetric to symmetric requests.

BACKGROUND

In a two dimensional matrix of data cells, each cell has two defining features: a function (e.g. tuple function) and a value. The function is editable by a user and when run, an associated value is returned and displayed in the cell. In a multidimensional database, a tuple is comprised of a set of data members from different dimensions, where one of the dimensions contains measure members (e.g. tuple, ([Products].[All Products], [Years].[All Years], [Measure].[Revenue]).

When a cell with a tuple function is run, the value of the tuple is looked up in a local cache. If a local cache of a data processing system contains no value for the tuple, the tuple is requested from a server. The cache can be cleared at any time and a collection of cells or all of the cells can be refreshed in one operation. When the refreshing occurs, the tuples are collected in a randomized order. After all of the tuples are collected, the request is made to the server and the tuples are batched together in one request. However, this conventional batch tuple request is inefficient because it is common for multiple tuples to share member references.

To overcome this issue, conventional methods include utilizing a transformation to convert the batch tuple request into a crossjoin of a collection of member sets across each dimension. Thus, the asymmetric request is converted into a symmetric request. This conventional method has the drawback of returning more data than the batch tuple request. Therefore, there is a strong need for a cost-effective and efficient solution that converts a batch tuple request into a collection of symmetric requests while minimizing the amount of extra data that would result from the conversion. The present invention addresses such a need.

SUMMARY OF THE INVENTION

A method, a computer system, and a computer program product for converting asymmetric requests into symmetric requests are disclosed. In a first aspect, the method comprises a computer partitioning a query into a set of partitions along a dimension of a multi-dimensional data source, wherein each partition of the set of partitions comprises more than one member and the query has a query result count. The method includes the computer creating a candidate query for each partition of the set of partitions, wherein each candidate query has a candidate query result count. Responsive to a determination that the query result count is greater than a sum of the candidate query result counts, the method includes the computer substituting the query with the candidate queries.

In a second aspect, the computer system comprises one or more processors, one or more computer-readable memories and one or more computer-readable, tangible storage devices; and program instructions, stored on at least one of the one or more storage devices for execution by at least one of the one or more processors via at least one of the one or more memories to partition a query into a set of partitions along a dimension of a multi-dimensional data source, wherein each partition of the set of partitions comprises more than one member and the query has a query result count; create a candidate query for each partition of the set of partitions, wherein each candidate query has a candidate query result count; and responsive to a determination that the query result count is greater than a sum of the candidate query result counts, substitute the query with the candidate queries.

In a third aspect, the computer program product comprises a computer readable storage medium having program code embodied therewith, the program code readable/executable by a computer to: partition, by a computer, a query into a set of partitions along a dimension of a multi-dimensional data source, wherein each partition of the set of partitions comprises more than one member and the query has a query result count; create, by the computer, a candidate query for each partition of the set of partitions, wherein each candidate query has a candidate query result count; and responsive to a determination that the query result count is greater than a sum of the candidate query result counts, substitute, by the computer, the query with the candidate queries.

BRIEF DESCRIPTION OF THE DRAWINGS

The accompanying figures illustrate several embodiments of the invention and, together with the description, serve to explain the principles of the invention. One of ordinary skill in the art will recognize that the particular embodiments illustrated in the figures are merely exemplary, and are not intended to limit the scope of the present invention.

DETAILED DESCRIPTION

The present invention relates to data analysis, and more particularly, to minimizing result set size when converting from asymmetric to symmetric requests. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiments shown but is to be accorded the widest scope consistent with the principles and features described herein.

A method, computer system, and computer program product in accordance with the present invention minimizes a result set size when converting from asymmetric to symmetric requests. In a multi-dimensional database or data source, a set of tuples are converted from an asymmetric batch tuple request into a symmetric crossjoin of a collection of member sets each associated with a dimension. The conversion retains the original tuple definitions, and if the resulting set size (or count) is determined to be below a threshold, the conversion is complete for the set of tuples. If the resulting set size is determined to be above the threshold, for each member set excluding the largest member set, each tuple that contains a member is placed into an associated partition for that member and the associated result count is calculated for each partition. If the result set size is reduced as a result of the partitioning, the partitioning is applied to each partition.

To describe the features of the present invention in more detail, refer now to the following description in conjunction with the accompanying Figures.

In a multidimensional database, a tuple is a collection of data members from different dimensions with one of the dimensions containing measure members. Each tuple has an associated value which can be requested from the database. A collection of tuples can be grouped together into one batch request provided the tuples are all referencing members from the same dimensions. Additionally, if the multidimensional database has a default member for each dimension defined, a collection of tuples can be grouped together into one batch request. If a tuple does not reference a member in a dimension, the default member of the dimension is referenced.

In one embodiment, a multidimensional database does not have default members defined for each dimension. In this embodiment, A, B, and C are non-measure dimensions and M is a measure dimension. The dimension A has members A1 and A2, the dimension B has members B1, B2, and B3, and the dimension C has members C1, C2, and C3. The dimension M has one member M1.

The following is a set of tuples: T1=tuple (A1, B1, M1); T2=tuple (A1, B2, M1); T3=tuple (A2, B1, M1); T4=tuple (A2, B3, M1); T5=tuple (A1, C1, M1); T6=tuple (A2, C3, M1); and T7=tuple (B1, C2, M1). In the set of tuples, T1, T2, T3, and T4 can be grouped together and requested all in one batch request. In the set of tuples, T5 and T6 can be grouped together and requested all in another batch request. T7 does not match up with any other tuple within the set of tuples because none of the other tuples (T1-T6) share dimensionality. Thus, T7 requires a separate request from all the other tuples. Tuples can be grouped together only if they share dimensionality.

A batch tuple request references each member for each tuple which does not utilize recurring member references. The batch tuple request is transformed into a crossjoin request which is an operation that allows the request to include a combination of member sets. A member set is a set of members from the same dimension.

In one embodiment, the requests for T1, T2, T3, and T4 are grouped together into one original batch tuple request defined as batch (tuple (A1,B1,M1), tuple (A1,B2,M1), tuple (A2,B1, M1), tuple (A2,B3,M1)). In this embodiment, the batch tuple request is transformed into a crossjoin request defined as crossjoin (set (A1,A2), set (B1,B2,B3), M1) which is a more compact definition in comparison to the batch tuple request definition because it is shorter and simpler. The crossjoin request is a transformation operation that takes either a member set or a single member and provides a request for the combination of all members from each member set.

In response to the crossjoin request, the multidimensional database returns the same results as a batch tuple request defined as batch (tuple (A1,B1,M1), tuple (A1,B2,M1), tuple (A1,B3,M1), tuple (A2,B1,M1), tuple (A2,B2,M1), tuple (A2,B3,M1)). Thus, although the crossjoin request is more compact in its definition, the crossjoin request results in more data being returned than the original batch tuple request and thus a higher result count. As the tuple collection size increases, the transformed crossjoin request generates many more results than the original batch tuple request.

In one embodiment, the requests for T5 and T6 are grouped together into one original batch tuple request defined as batch (tuple (A1,C1,M1), tuple (A2,C3,M1)) and transformed into a crossjoin request defined as crossjoin (set (A1,A2), set (C1,C3), M1). In response to the crossjoin request, the multidimensional database returns the same results as a batch tuple request defined as batch (tuple (A1,C1,M1), tuple (A1, C3,M1), tuple (A2,C1,M1), tuple (A2,C3,M1) which is double the number of results as compared with the original batch tuple request defined as batch (tuple (A1,B1,M1), tuple (A1,B2,M1), tuple (A2,B1,M1), tuple (A2,B3,M1)).

For a starting tuple set, transforming a batch tuple request into a crossjoin request results in a query result count. To reduce the query result count, the starting tuple set is partitioned into subsets. The starting tuple set is grouped into a batch tuple request and then transformed into a crossjoin request. The number of results due to this transformation is calculated by multiplying the counts of each member set defined as a set of unique members of the same dimension to provide an original result count. Every dimension is considered for splitting in order of least to greatest number of members, excluding dimensions with single members and the last dimension which includes the greatest number of members.

For each considered dimension, the starting tuple set is partitioned such that each member of each considered dimension defines the partition. For example, if a considered dimension has three associated members, the starting tuple set is partitioned into three subsets and membership within the three subsets is uniquely based upon which member of the considered dimension is placed within each partitioned subset.

The subsets are grouped into a batch tuple request and then transformed into a crossjoin request. The number of results due to this transformation is calculated to provide a subset result count for each subset. The original result count is compared to the sum of the subset result counts. If the sum of the subset result counts is equal to the original result count, then the subsets are discarded and the starting tuple set is analyzed to determine another partitioning with respect to a next dimension hierarchy. If either all dimensions are considered or a subset of the dimensions are considered per processing performance requirements and no result count improvements are found, the starting tuple set is deemed to be sufficiently partitioned.

If the sum of the subset result counts is less than the original result count, the same aforementioned partitioning is applied to each subset to create further partitions that yield result count improvements. If no result count improvements are found as a result of the additional partitions and result count comparisons, the partitioning stops, and the starting tuple set is deemed to be sufficiently partitioned.

Figure 1:
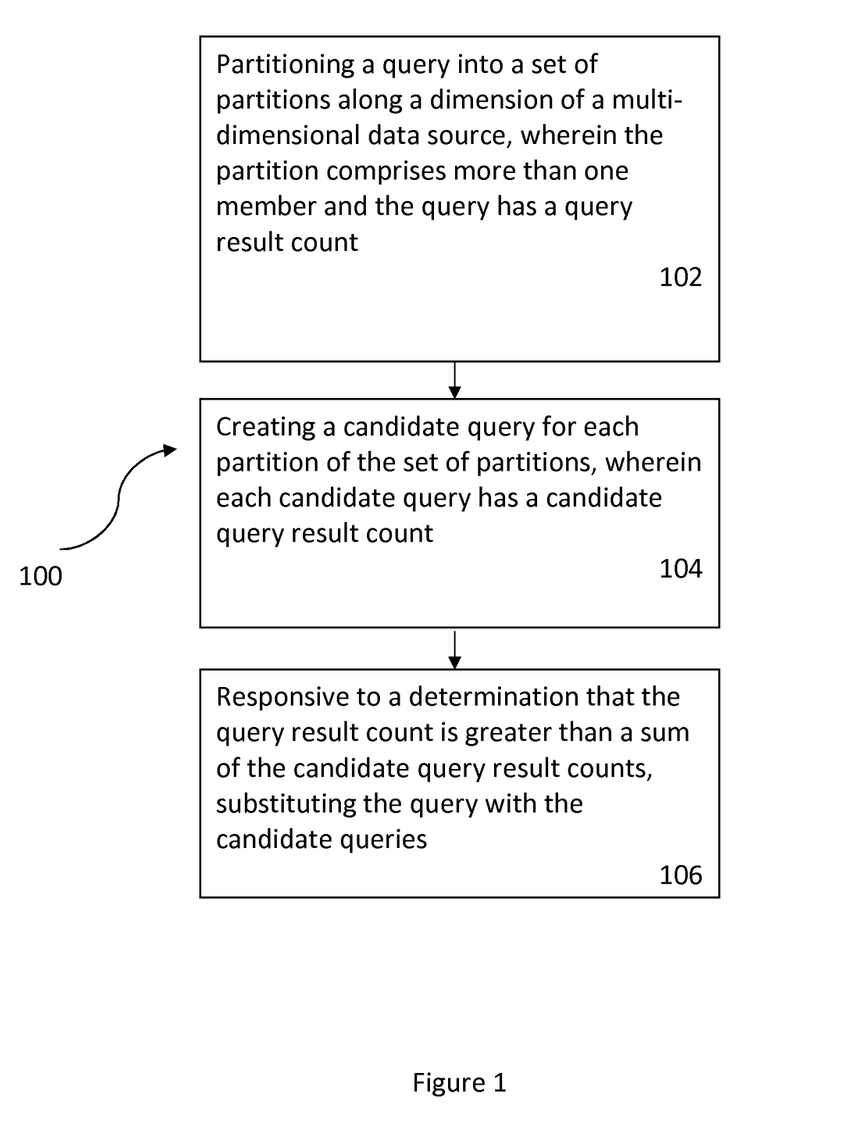
FIG. 1 illustrates a method for converting asymmetric requests into symmetric requests in accordance with an embodiment.

FIG. 1 illustrates a method 100 for converting asymmetric requests into symmetric requests in accordance with an embodiment. The method 100 comprises partitioning a query into a set of partitions along a dimension of a multi-dimensional data source, wherein the partition comprises more than one member and the query has a query result count, via step 102. The method 100 includes creating a candidate query for each partition of the set of partitions, wherein each candidate query has a candidate query result count, via step 104. The method 100 includes responsive to a determination that the query result count is greater than a sum of the candidate query result counts, substituting the query with the candidate queries, via step 106.

In one embodiment, the method 100 includes responsive to a determination that the query result count is equal to the sum of the candidate query result counts, ignoring the candidate queries. In another embodiment, the partitioning, the creating, and the substituting steps of the method 100 are performed if the query result count exceeds a threshold value and these steps are recursively applied to each of the created candidate queries. In one embodiment, the query result count is calculated by transforming the query into a crossjoin request and by multiplying a unique member count of each dimension of the multi-dimensional data source.

Figure 2:
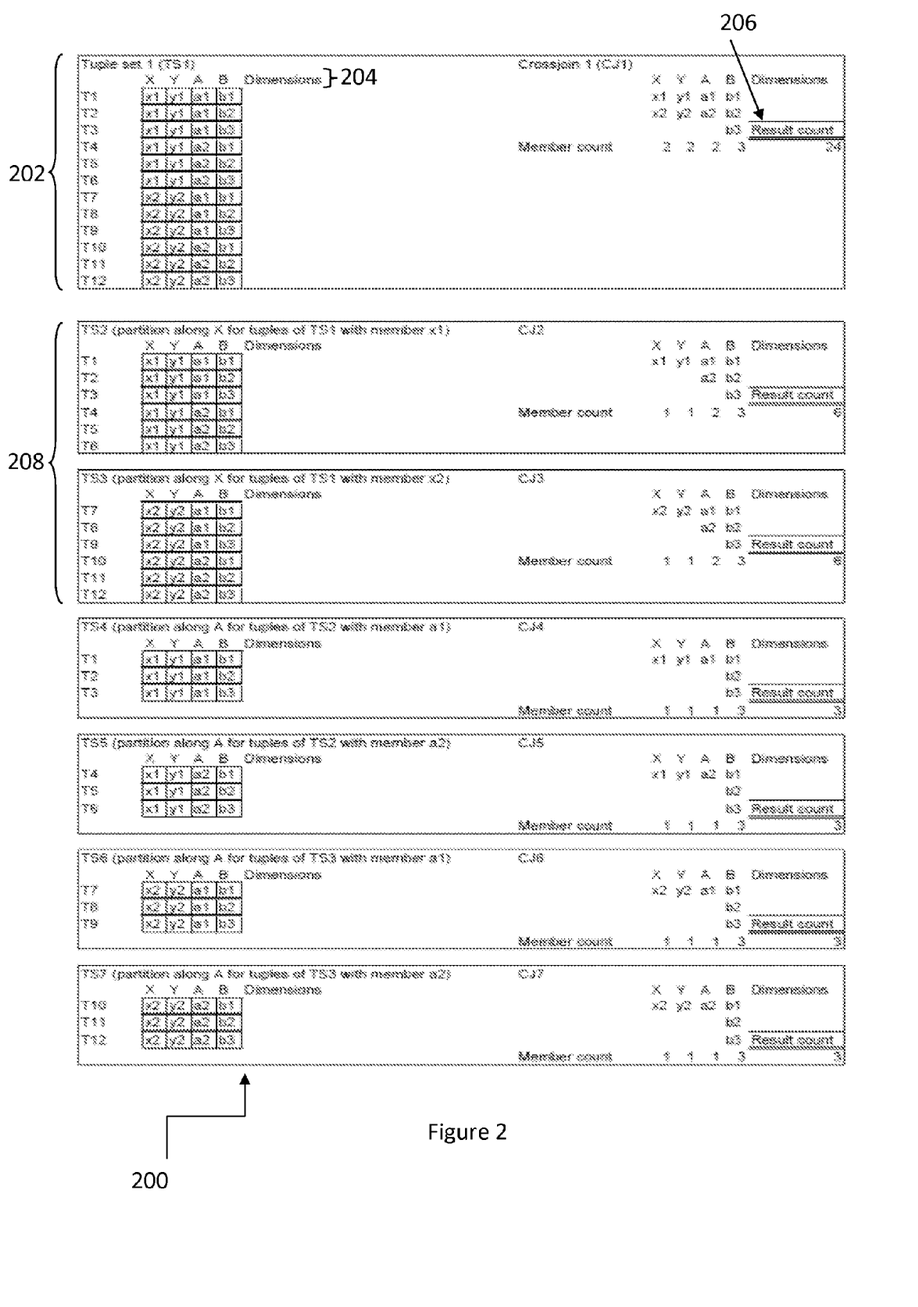
FIG. 2 illustrates a diagram of the partitioning of a tuple set of a multi-dimensional data source with a plurality of dimensions in accordance with an embodiment.

FIG. 2 illustrates a diagram 200 of the partitioning of a tuple set 202 (TS1) of a multi-dimensional data source with a plurality of dimensions 204 in accordance with an embodiment. TS1 is the tuple set of all tuples of a query that includes a query result count 206. In one embodiment, TS1 is partitioned into subsets TS2 and TS3 that are associated with candidate queries 208, along the X dimension because the X dimension is one of the dimensions with the smallest count of unique members. The associated crossjoin request (CJ1) result count for TS1 is 24. When partitioned into TS2 and TS3, the combined result count from the crossjoin requests CJ2 and CJ3 is 12 (a result count of 6 from TS2 and a result count of 6 from TS3). Accordingly, the combined result count of CJ2 and CJ3 (12) is an improvement over the CJ1 result count (24), and thus the subset partitions TS2 and TS3 are kept and TS1 is discarded.

The number of tuples in the tuple sets TS2 and TS3 equal the result count of CJ2 and CJ3 respectively. Therefore, no further partitioning of either tuple set can improve/reduce the result count and the partitioning stops for both TS2 and TS3 which represent the most compact representation of TS1. However, to illustrate further partitioning, TS2 is partitioned into subsets TS4 and TS5 that are associated with additional candidate queries along the A dimension. No result count improvement is realized as the result count for TS2 is 6 and the result counts for TS4 and TS5 are both 3 for a combined result count of 6. Thus, the partitions TS4 and TS5 are discarded and further ways to partition TS2 are analyzed. None are found and so the result count of TS2 (CJ2) is kept. Similarly, partitioning of TS3 into subsets TS6 and TS7 that are associated with additional candidate queries yields no result count improvements and so the result count of TS3 (CJ3) is kept. TS2, TS3, TS4, TS5, TS6, and TS7 represent a set of partitions of the original tuple set TS1.

Figure 3:
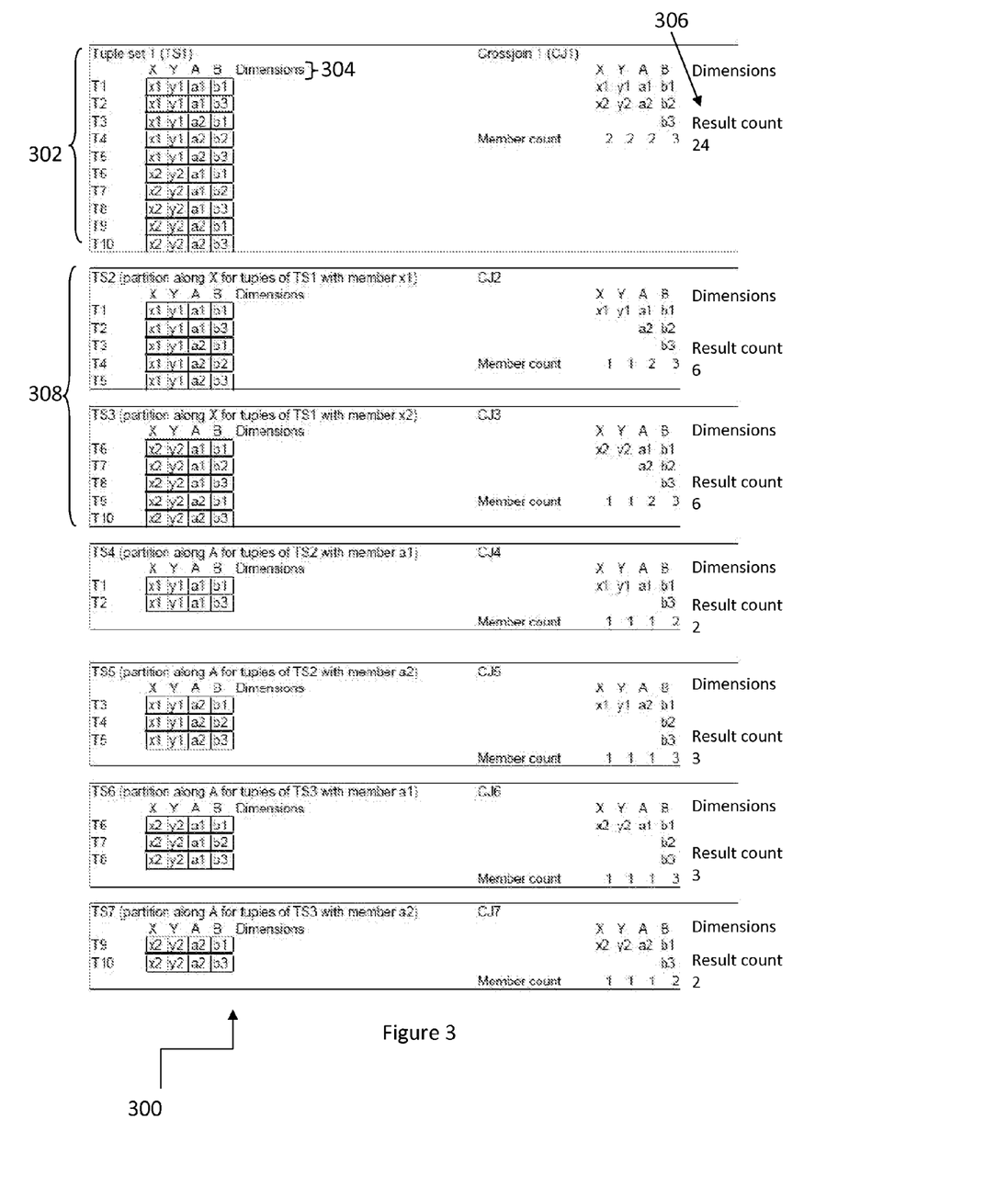
FIG. 3 illustrates a diagram of the partitioning of a tuple set of a multi-dimensional data source with a plurality of dimensions in accordance with another embodiment.

FIG. 3 illustrates a diagram 300 of the partitioning of a tuple set 302 (TS1) of a multi-dimensional data source with a plurality of dimensions 304 in accordance with another embodiment. TS1 is the tuple set of all tuples of a query that includes a query result count 306. In one embodiment, TS1 is partitioned into subsets TS2 and TS3 that are associated with candidate queries 308, along the X dimension because the X dimension is one of the dimensions with the smallest count of unique members. The associated crossjoin request (CJ1) result count for TS1 is 24. When partitioned into TS2 and TS3, the combined result count from the crossjoin requests CJ2 and CJ3 is 12 (a result count of 6 from TS2 and a result count of 6 from TS3). Accordingly, the combined result count of CJ2 and CJ3 (12) is an improvement over the CJ1 result count (24), and thus the subset partitions TS2 and TS3 are kept and TS1 is discarded.

TS2 is further partitioned along the A dimension into subsets TS4 and TS5 that are associated with additional candidate queries. When partitioned into TS4 and TS5, the combined result count from the crossjoin requests CJ4 and CJ5 is 5 (a result count of 2 from TS4 and a result count of 3 from TS5). Accordingly, the combined result count of CJ4 and CJ5 (5) is an improvement over the CJ2 result count (6), and thus the subset partitions TS4 and TS5 are kept and TS2 is discarded.

TS3 is further portioned along the A dimension into subsets TS6 and TS7 that are associated with additional candidate queries. When partitioned into TS6 and TS7, the combined result count from the crossjoin requests CJ6 and CJ7 is 5 (a result count of 3 from TS6 and a result count of 2 from TS7). Accordingly, the combined result count of CJ6 and CJ7 (5) is an improvement over the CJ3 result count (6), and thus subset partitions TS6 and TS7 are kept and TS3 is discarded. In this embodiment, no other partitions can be made and so TS4, TS5, TS6, and TS7 represent the most compact representation of TS1.

In one embodiment, the result count of TS2 and TS3 (CJ2 and CJ3 respectively) are sent to a server to represent all the tuples in TS1. One of ordinary skill in the art readily recognizes that the server can include a variety of computer systems and that would be within the spirit and scope of the present invention. If a portion of a tuple set can no longer be partitioned, a request of the result count of the portion is sent immediately to the server while improvements in other portions of the tuple set are analyzed. In another embodiment, partitioning TS1 along dimension A first would yield no improvements. The next dimensions X and Y would then be considered which both would result in a result count reduction. Therefore, once again, the partitions are kept and TS1 is discarded.

In one embodiment, to guard against extra processing and over partitioning of the original tuple set, a partitioning threshold is utilized. If the result count of a tuple set is less than the partitioning threshold, the tuple set is accepted as sufficiently partitioned. In another embodiment, other stopping conditions are added to guard against extra processing including but not limited to percentage improvements, minimum result count thresholds being met, or a condition geared towards a particular application.

In one embodiment, a set of data points within a data cube (e.g. OLAP data cube) that is represented by an initial tuple set is denoted T and a set of data points that are retrieved from querying the data cube using a set of final crossjoin sets is denoted C. In this embodiment, the set of data points C includes all of the set of data points T. Utilizing a method in accordance with the present invention, the size of the set of data points C is minimized towards the size of the set of data points T.

As above described, the method allows for minimizing the result set size of a tuple set within a multi-dimensional database when converting from asymmetric to symmetric data requests. By partitioning a starting tuple set into subsets and comparing the result counts of the subsets to the original result count of the starting tuple set, partitioning that yields improvements to the result count is determined.

A method, a computer system, and a computer program product for converting asymmetric requests into symmetric requests have been disclosed. As will be appreciated by one skilled in the art, aspects of the present invention may be embodied as a method, system, or computer program product. Accordingly, aspects of the present invention may take the form of an entirely hardware embodiment, an entirely software embodiment (including firmware, resident software, micro-code, etc.) or an embodiment combining software and hardware aspects that may generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer ore entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein and below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instruction stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart illustrations and block diagrams in the Figures illustrate the architecture, functionality, and operation of possible implementations of methods, systems and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Figure 4:
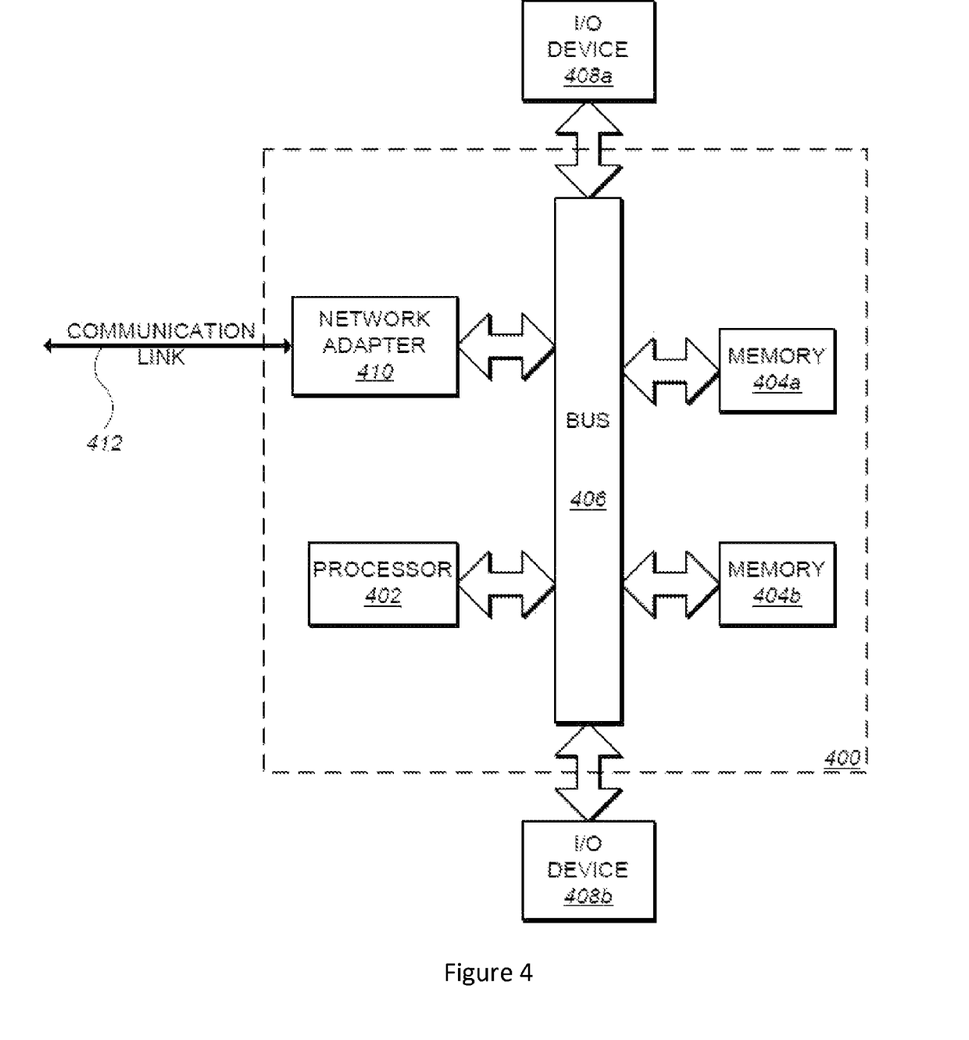
FIG. 4 illustrates a data processing system suitable for storing the computer program product and/or executing program code in accordance with an embodiment.

FIG. 4 illustrates a data processing system 400 suitable for storing the computer program product and/or executing program code in accordance with an embodiment. The data processing system 400 includes a processor 402 coupled to memory elements 404a-b through a system bus 406. In other embodiments, the data processing system 400 may include more than one processor and each processor may be coupled directly or indirectly to one or more memory elements through a system bus.

Memory elements 404a-b can include local memory employed during actual execution of the program code, bulk storage, and cache memories that provide temporary storage of at least some program code in order to reduce the number of times the code must be retrieved from bulk storage during execution. As shown, input/output or I/O devices 408a-b (including, but not limited to, keyboards, displays, pointing devices, etc.) are coupled to the data processing system 400. I/O devices 408a-b may be coupled to the data processing system 400 directly or indirectly through intervening I/O controllers (not shown).

In FIG. 4, a network adapter 410 is coupled to the data processing system 400 to enable data processing system 400 to become coupled to other data processing systems or remote printers or storage devices through communication link 412. Communication link 412 can be a private or public network. Modems, cable modems, and Ethernet cards are just a few of the currently available types of network adapters.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer system for minimizing query result counts, the computer system comprising:
   one or more processors, one or more computer-readable memories and one or more computer-readable, tangible storage devices;
   program instructions, stored on at least one of the one or more storage devices for execution by at least one of the one or more processors via at least one of the one or more memories, to:
      partition a query into a set of partitions along a dimension of a multi-dimensional data source, wherein each partition of the set of partitions comprises more than one member and the query has a query result count;
      create a candidate query for each partition of the set of partitions, wherein each candidate query has a candidate query result count; and
      responsive to a determination that the query result count is greater than a sum of the candidate query result counts, substitute the query with the candidate queries.

2. The computer system of claim 1, further comprising program instructions to:
   responsive to a determination that the query result count is equal to the sum of the candidate query result counts, ignore the candidate queries.

3. The computer system of claim 1, wherein the partitioning, the creating, and the substituting are performed if the query result count exceeds a threshold value.

4. The computer system of claim 1, wherein the partitioning, the creating, and the substituting are recursively applied to at least one of the created candidate queries.

5. The computer system of claim 1, wherein the query result count is calculated by transforming the query into a crossjoin request and by multiplying a unique member count of at least one dimension of the multi-dimensional data source.

6. The computer system of claim 1, wherein a dimension with the most members and dimensions with single members are excluded from the partitioning.

7. The computer system of claim 1, wherein an initial set of tuples represents a collection of data points within a cube and a final set of crossjoin sets defines queries that retrieve the collection of data points.

8. A computer program product for minimizing query result counts, the computer program product comprising a computer readable storage medium having program code embodied therewith, the program code executable by a computer to:
   partition, by the computer, a query into a set of partitions along a dimension of a multi-dimensional data source, wherein each partition of the set of partitions comprises more than one member and the query has a query result count;
   create, by the computer, a candidate query for each partition of the set of partitions, wherein each candidate query has a candidate query result count; and
   responsive to a determination that the query result count is greater than a sum of the candidate query result counts, substitute, by the computer, the query with the candidate queries.

9. The computer program product of claim 8, further wherein the program code is executable by a computer to:
   responsive to a determination that the query result count is equal to the sum of the candidate query result counts, ignore, by the computer, the candidate queries.

10. The computer program product of claim 8, wherein the partitioning, the creating, and the substituting are performed if the query result count exceeds a threshold value.

11. The computer program product of claim 8, wherein the partitioning, the creating, and the substituting are recursively applied to at least one of the created candidate queries.

12. The computer program product of claim 8, wherein the query result count is calculated by transforming the query into a crossjoin request and by multiplying a unique member count of at least one dimension of the multi-dimensional data source.

13. The computer program product of claim 8, wherein the dimension with the most members and dimensions with single members are excluded from the partitioning.

* * * * *